S. OTIS.
SAFETY WASHOUT PLUG.
APPLICATION FILED JUNE 25, 1920.
1,396,659.
Patented Nov. 8, 1921.
2 SHEETS—SHEET 1.
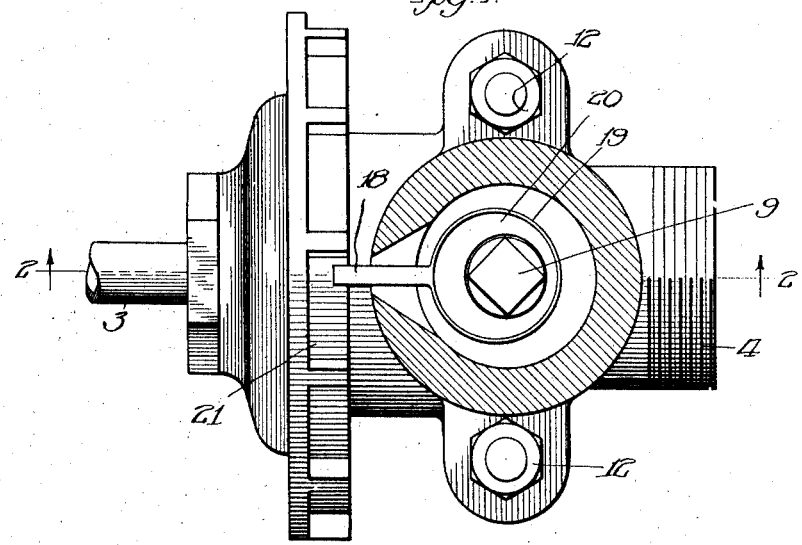
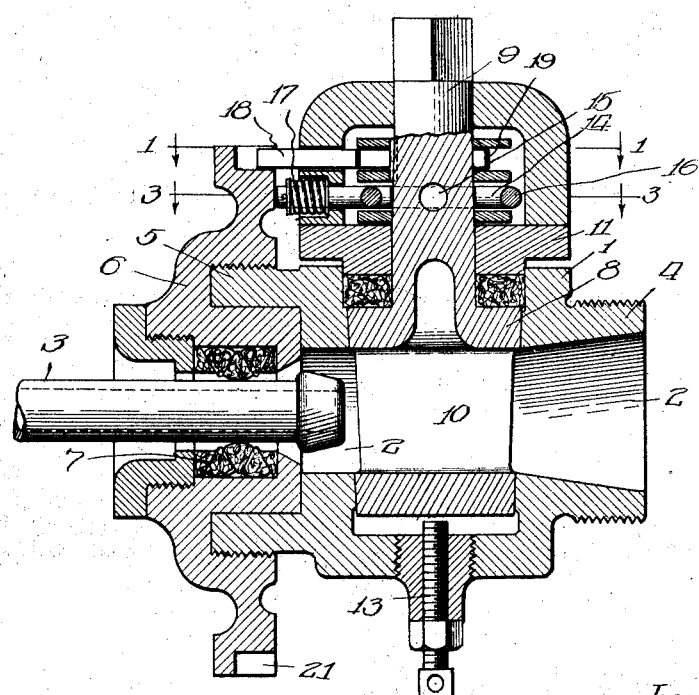
Witness:
R. Buckhardt
Inventor:
Spencer Otis,
By Wilkinson, Huxley, Byron & Knight
Attys.

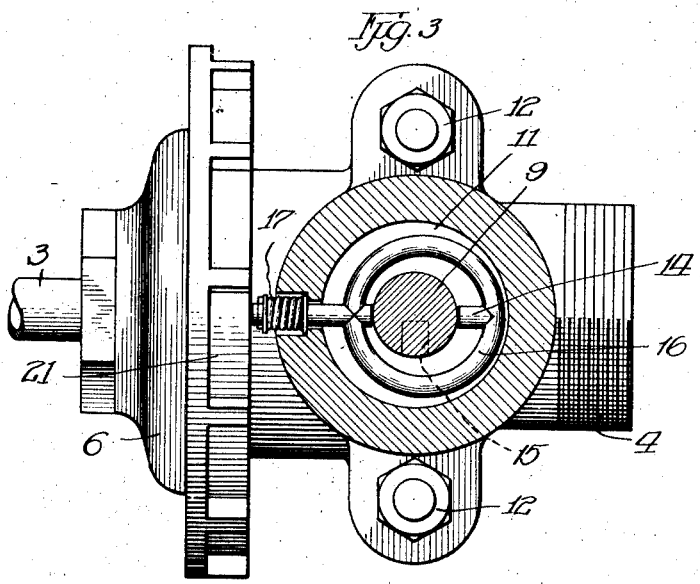
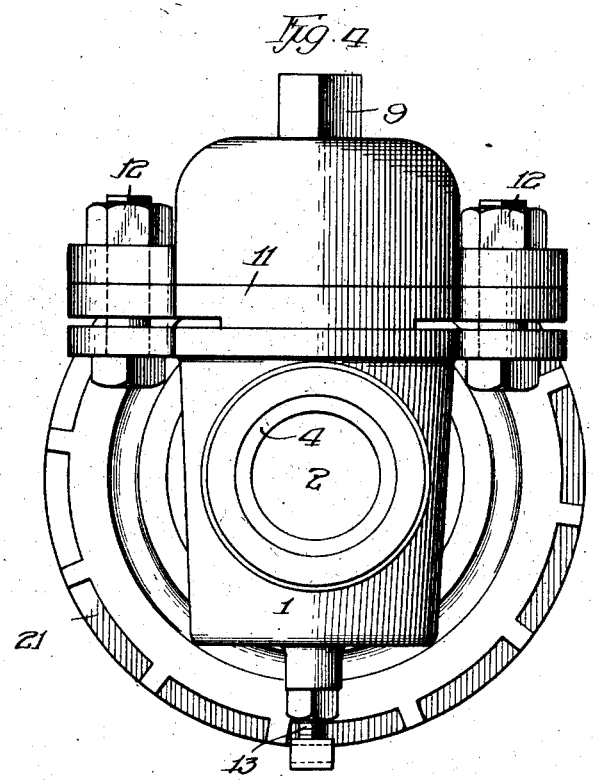

UNITED STATES PATENT OFFICE.

SPENCER OTIS, OF CHICAGO, ILLINOIS.

SAFETY WASHOUT-PLUG.

1,396,659.   Specification of Letters Patent.   Patented Nov. 8, 1921.

Application filed June 25, 1920. Serial No. 391,795.

*To all whom it may concern:*

Be it known that I, SPENCER OTIS, a citizen of the United States, residing at Chicago, in the county of Cook and State of Illinois, have invented certain new and useful Improvements in Safety Washout-Plugs, of which the following is a specification.

This invention relates to a plug through means of which an instrument, for instance, an air blast nozzle, may be introduced with safety into the interior of a container, for instance, a steam boiler, while the container is under pressure, and has for its object to provide upon the plug, in addition to the valve which opens to admit the nozzle, a coupling packed around the nozzle and adapted to close the container against the escape of its contents while its valve is open, and to so combine the coupling and the plug that the valve cannot be opened until the coupling is applied, and the coupling cannot, therefore, be removed until the valve is again closed.

In carrying out the invention, the valve is provided with a dogging device that automatically resists turning of the valve until the coupling has been brought into secure closing relation to the passageway opened by the valve; while an additional dogging device, controlled by the turning of the valve, so engages the coupling as to prevent uncoupling movement so long as the valve is open.

In the accompanying drawings—

Figure 1 is a plan view of a plug embodying the subject-matter of the present invention, with the coupling in place and with the housing in section in the horizontal plane of the device which locks the coupling.

Fig. 2 is a section of the same in the plane of the axes of the valve and the passageway through the plug.

Fig. 3 is a view similar to Fig. 1, but with the housing in horizontal section in the plane of the device which locks the valve; and Fig. 4 is an end elevation of the plug seen from the right of Figs. 1, 2, and 3.

1 represents the shell of the plug having a diametric passageway 2 to receive an instrument such, for instance as an air blast nozzle 3, and with a threaded attaching neck 4 adapted to be screwed into the wall of a receptacle, such for instance, as the shell of a boiler, and a coupling flange 5 adapted to receive a coupling disk 6 closed about the nozzle 3 through means of a packing 7 and adapted to enter into such relation to the shell 1 as to close the diametric opening through the plug whenever the coupling is in place.

Fitted in the shell 1, in position to close the passageway 2, is a plug valve 8 having a controlling stem 9 and a passageway 10 adapted to be brought into coincidence with the passageway 2 by the rotation of the valve when it is desired to gain access to the interior of the container. Valve 8 is pressed to a tapered seat in the shell 1 to the extent permitted by the stop screw 13 by means of the cap 11 having cap screws 12; the usual packing being preferably introduced between the cap and the valve.

From so much of the description it is obvious that if the coupling disk 6, with the nozzle 3 suitably packed therein, be firmly screwed upon the coupling flange 5, the passageway through the shell will be sufficiently controlled to make it safe to open the valve 8 even though the container be under high pressure.

In order to prevent inadvertent opening of the valve 8 until the coupling disk is in place, a dogging bolt 14, located in position to enter the seat 15 whenever the valve 8 is closed, is carried by frame 16 under control of a spring 17 that normally presses the frame in the direction to thrust the bolt into the seat. The end of the frame 16, however, projects into the path of the disk 6 so that whenever said disk reaches tight closing position upon the coupling flange 5, bolt 12 will free the valve 8 and permit the latter to be turned to complete the passageway through the shell 1.

In order to prevent inadvertent removal of the disk 6 until after the valve 8 has been closed, a disk lock 18, controlled by strap 19 surrounding the eccentric 20 on the stem 9, is adapted to intersect the periphery of the disk 6, as, for instance, by entering one of the recesses 21 formed in said periphery, and thereby prevent unscrewing of the disk 6. Eccentric 20 is, of course, positioned upon stem 9 so that the outward thrust of the disk lock 18 will occur whenever the valve 8 is assuming a position which would in any degree open the passageway 2, 10, and withdrawal of said disk lock 18 to permit the disk to be unscrewed whenever the valve 1 reaches a position to close said passageway, and preferably only after it has been rotated far enough to receive the dogging bolt 14 into the seat 15.

I claim:

1. A plug for containers having a valve, a removable closure independent of said valve, and a blast nozzle longitudinally movable therein and adapted to operate through the valve when the latter is open.

2. A plug for containers having a valve, a removable closure in addition to said valve, and a locking device controlling the valve and which is in turn controlled by said removable closure.

3. A plug for containers having a valve, a removable closure in addition to said valve, a locking device for preventing the opening of said valve, adapted to be released by the application of said additional closure to the plug, and a locking device for said additional closure which is controlled by the opening and closing of the valve.

4. A plug for containers having a valve for opening and closing the plug, an instrument coupling constituting a closure for said plug in addition to its valve, means for securing said additional closure to the plug, a locking device for the valve pressed to unlocking position by the application of said additional closure, a cam carried by the valve of the plug, and a locking device thrust into the path of movement which said additional closure assumes in removal from the plug.

5. In a plug for containers, the combination of a shell, a rotary valve mounted in said shell, a dogging bolt adapted to intersect a portion of said valve to resist rotation thereof when the valve is closed, means yieldingly urging said bolt into said rocking relation to the valve, and a coupling disk adapted to screw into position upon said plug, constructed to effect a closure of the plug independently of the valve, and displacing said dogging bolt from locking position when the disk reaches its plug closing position.

6. In a plug for containers, the combination of a shell, a rotary valve mounted in said shell, a coupling disk threaded to said shell and adapted to effect a closure of the shell independently of the valve, a lock movable into and out of position to resist rotation of said coupling disk, and a cam carried upon said valve for moving said lock.

Signed at Chicago, Illinois, this 22nd day of June, 1920.

SPENCER OTIS.